United States Patent Office 3,325,527
Patented June 13, 1967

3,325,527
O-ESTERS OF 1-MERCAPTO-2-NAPHTHOL
William Baptist Hardy, Bound Brook, Joan Lois Gallagher, Finderne, and Frederic Henry Adams, Bound Brook, N.J., assignors to American Cyanamid Company, Stamford, Conn., a corporation of Maine
No Drawing. Filed July 11, 1963, Ser. No. 294,256
6 Claims. (Cl. 260—456)

This invention relates to improved plasticization of elastomers using a new class of catalytic plasticizers; and to plasticized compositions.

Many known plasticizers for natural rubber and synthetic rubber-like materials are not wholly satisfactory for one or more of several reasons. Although exhibiting excellent plasticizing properties, some are too toxic for general use. Others exhibit disagreeable odors which often are also imparted to the finished rubber article. Some are not effective plasticizers at the relative low temperatures of the open mill. Still other plasticizers are unstable on storage. Some which are effective in the processing of natural rubber are found to be ineffective for softening synthetic rubber-like materials.

It is a primary object of this invention to provide an improved process of plasticizing elastomers employing a new class of plasticizers. It is a further object of this invention to provide an improved plasticizing process which is substantially free of the various disadvantages noted above. In accordance with this invention, this improved process comprising plasticizing an elastomer using as a new catalytic plasticizer an O-ester of 1-mercapto-2-naphthol of the formula

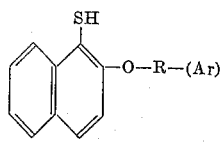

wherein "R" is a member of the group consisting of

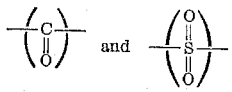

and "(Ar)" is a mononuclear carbocyclic radical, such as phenyl and p-tolyl.

Plasticizers of this invention are exceptionally free of the various disadvantages of many known plasticizers. An outstanding feature of these plasticizers is their unusual effectiveness at both high and low milling temperatures. Such high plasticizing activity in view of the previous opinion in the art, as for example in U.S. Pat. No. 2,064,580 is that substituents on the aromatic nucleus of naphthalenethiol should consist only of carbon and hydrogen for effective plasticizing. Further, plasticizers of this invention have the added advantage of low acute toxicity. For example 2-naphthalenethiol, a well known aryl mercaptan plasticizer, has an $LD_{50}$ (mice) of 617 mg./kg. whereas the 1-mercapto-2-naphthyl benzoate of this invention has an $LD_{50}$ of over 2,000.

It is a further advantage of this invention that it may be practiced on synthetic rubber-like materials as well as natural rubber. By synthetic rubber-like materials is meant polymers of a butadiene-1,3 such as butadiene-1,3; methyl-2-butadiene-1,3; chloro-2-butadiene-1,3; and the like, as well as copolymers of these with acrylonitrile, styrene, methyl methacrylate, isobutylene and the like. The amount of plasticizer employed may vary according to the particular elastomer being treated, the particular plasticizer employed, as well as the conditions of plasticizing. In general, the amount employed will be from about 0.01–5.0% on the weight of the rubber, the amount usually being somewhat greater for synthetic rubber-like materials than for natural rubber.

Plasticizing compounds of this invention may be prepared by treatment of the corresponding esters of 1,1'-dithiodi-2-naphthol in an acetic acid solution with zinc dust. The diesters of 1,1'-dithiodi-2-naphthol are prepared by the method of Onufrowicz, Ber. 23, 3367 (1890), and Jusa et al., Monatsh. 72, 93 (1938); i.e., by reacting 1,1'-dithiodi-2-naphthol with the appropriate acyl chloride. Typical compounds include the following.

1-mercapto-2-naphthyl benzoate
1-mercapto-2-naphthyl o-toluate
1-mercapto-2-naphthyl p-toluate
1-mercapto-2-naphthyl m-ethylbenzoate
1-mercapto-2-naphthyl 2,4-dimethylbenzoate
1-mercapto-2-naphthyl benzenesulfonate
1-mercapto-2-naphthyl o-toluenesulfonate
1-mercapto-2-naphthyl p-toluenesulfonate
1-mercapto-2-naphthyl p-xylenesulfonate Preparation of the plasticizers of this invention is illustrated by the following examples. All parts are by weight unless otherwise indicated.

EXAMPLE 1

*1-mercapto-2-naphthyl benzoate*

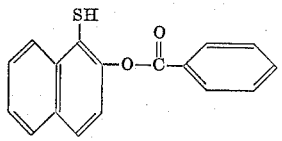

To a solution of 25 parts (0.048 mol) of dibenzoate of 1,1'-dithiodi-2-naphthol in 800 parts of glacial acetic acid at 90–95° C., 25 parts of zinc dust and 30 parts of 97% hydrochloric acid are added alternately in small portions until the solution is water-clear. After filtering to remove unreacted zinc, the filtrate is poured into 1,000 parts of water and ice. The product, isolated by filtration, washed with water and dried in vacuo, amounts to 12 parts and melts at 125°–144° C.

EXAMPLE 2

*1-mercapto-2-naphthyl p-toluate*

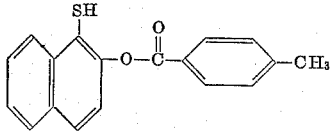

The procedure of Example 1 is followed substituting an equivalent quantity of di-p-toluate of 1,1'-dithiodi-2-naphthol for the dibenzoate of 1,1'-dithiodi-2-naphthol.

EXAMPLE 3

*1-mercapto-2-naphthyl benzenesulfonate*

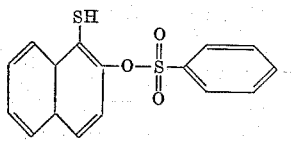

To a solution of 30 parts (0.048 mol) of dibenzenesulfonate of 1,1'-dithiodi-2-naphthol in 200 parts of glacial acetic acid at 90°–95° C., 5.0 parts of zinc dust and 22 parts of 97% hydrochloric acid are added alternately in small portions until the solution is water clear. Any unreacted zinc is filtered off and the filtrate is poured into 400 parts of water and ice. The precipitate is separated by filtration and then triturated with hexane. The product, after isolation by filtration, washing with benzene and drying in vacuo, amounts to 25.4 parts and melts as 58°–60° C.

EXAMPLE 4

*1-mercapto-2-naphthyl p-toluenesulfonate*

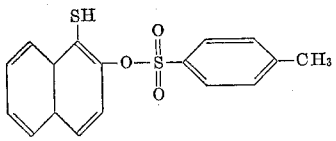

To a solution of 25.0 parts of di-p-toluenesulfonate of 1,1'-dithiodi-2-naphthol in 200 parts of glacial acetic acid at 85°–90° C., 12 parts of zinc dust and 12 parts of 97% hydrochloric acid are added alternately in small portions until the solution is water-clear. After filtering to remove any unreacted zinc, the filtrate is poured into 1,000 parts of ice and water. The precipitate is separated by filtration and triturated with hexane. The product, after isolation by filtration, and drying in vacuo, amounts to 20.1 parts and melts at 95°–96° C.

EXAMPLE 5

Samples of natural rubber, with and without plasticizer, are mixed for six minutes in a Banbury mixer using 40 pounds of steam in the jacket. Temperature of the mix when removed from the mixer is about 165° C. Viscosity of the rubber after mixing is measured in a Mooney shearing disc plastometer. Viscosity readings are taken after four minutes in the plastometer at 212° F. The lower the viscosity, the greater is the plasticity. Illustrative compositions in parts by weight and viscosity measurement results are shown in the following Table I.

TABLE I

| | Sample Number | | | | |
|---|---|---|---|---|---|
| | 1 | 2 | 3 | 4 | 5 |
| Smoked Sheets | 100 | 100 | 100 | 100 | 100 |
| 2-naphthalenethiol | | 0.25 | | | |
| 1-mercapto-2-naphthyl benzoate | | | 0.25 | | |
| 1-mercapto-2-naphthyl benzene-sulfonate | | | | 0.25 | |
| 1-mercapto-2-naphthyl p-toluene-sulfonate | | | | | 0.25 |
| Mooney Viscosity at 212° F. (ML-4) | 65 | 29 | 28 | 25 | 26 |

EXAMPLE 6

Samples of natural rubber are milled for ten minutes on an open mill at 70° C. Where used, plasticizer is added after one minute of milling. Mooney viscosity of the milled rubber is measured as in Example 5. Illustrative compositions and results are shown below in Table II.

TABLE II

| | Sample Number | | | |
|---|---|---|---|---|
| | 1 | 2 | 3 | 4 |
| Smoked Sheets | 100 | 100 | 100 | 100 |
| 2-naphthalenethiol | 0.083 | | | |
| 1-mercapto-2-naphthyl benzoate | | 0.083 | | |
| 1-mercapto-2-naphthyl benzene-sulfonate | | | 0.083 | |
| 1-mercapto-2-naphthyl p-toluene-sulfonate | | | | 0.083 |
| Mooney Viscosity at 212° F. (ML-4) | 44 | 46 | 43 | 46 |

EXAMPLE 7

Samples of natural rubber are milled for ten minutes in an open mill at 70° C. Where used, the plasticizer is added after one minute of milling. Mooney viscosity of the milled rubber is measured as in Example 5. Illustrative compositions and results are shown below in Table III.

TABLE III

| | Sample Number | | |
|---|---|---|---|
| | 1 | 2 | 3 |
| Smoked Sheets | 100 | 100 | 100 |
| 2-naphthalenethiol | | 0.166 | |
| 1-mercapto-2-naphthyl benzoate | | | 0.166 |
| Mooney Viscosity at 212° F. (ML-4) | 63 | 45 | 47 |

EXAMPLE 8

Samples of natural rubber are milled for ten minutes on an open mill at 105° C. Where used, equal mols of the plasticizers are added after one minute of milling.

The Mooney viscosity of the milled rubber is measured by the method of Example 5.

The results are shown in Table IV.

TABLE IV

| | Sample Number | | |
|---|---|---|---|
| | 1 | 2 | 3 |
| Smoked Sheets | 100 | 100 | 100 |
| 2-naphthalenethiol | 0.083 | | |
| 1-mercapto-2-naphthyl benzoate | | 0.146 | |
| 1-mercapto-2-naphthyl p-toluene-sulfonate | | | 0.172 |
| Mooney Viscosity at 212° F. (ML-4) | 53 | 47 | 48 |

EXAMPLE 9

Samples of natural rubber with and without plasticizer are mixed for six minutes in a Banbury mixer. Temperature of the mix when removed is about 145° C. Mooney viscosity of the milled rubber is measured as in Example 5. Illustrative compositions and results are shown below in Table V.

TABLE V

| | Sample Number | | | |
|---|---|---|---|---|
| | 1 | 2 | 3 | 4 |
| Smoked Sheets | 100 | 100 | 100 | 100 |
| 1-mercapto-2-naphthyl p-toluene-sulfonate | | 0.125 | 0.25 | 0.5 |
| Mooney Viscosity at 212° F. (ML-4) | 67 | 35 | 25 | 22 |

EXAMPLE 10

Samples of SBR 1006 synthetic rubber (75% butadiene and 25% styrene polymerized at 122° F.) and samples of Krylene NS synthetic rubber (butadiene-styrene polymerized at 41° F.) are milled for 15 minutes on an open mill at 100° C. Where used, the plasticizers are added after one minute of milling. Mooney viscosity of the milled rubber is again measured as in Example 5. Illustrative compositions and results are shown below in Table VI.

TABLE VI

| | 1 | 2 | 3 | 4 | 5 | 6 |
|---|---|---|---|---|---|---|
| SBR 1006 | 100 | 100 | 100 | | | |
| Krylene NS | | | | 100 | 100 | 100 |
| 2-naphthalenethiol | | 0.33 | | | 0.33 | |
| 1-mercapto-2-naphthyl p-toluenesulfonate | | | 0.33 | | | 0.33 |
| Mooney Viscosity at 212° F. (ML-4) | 40 | 34 | 28 | 48 | 45 | 36 |

EXAMPLE 11

Samples of Krylene NS synthetic rubber (butadiene-styrene polymerized at 41° F.), with and without plasticizer are mixed for six minutes in a Banbury mixer. The temperature of the rubber when removed from the mixer is about 145° C. Again, the Mooney viscosity of the milled rubber is measured as noted in Example 5. Illustrative results are shown below in Table VII.

TABLE VII

| | Sample Number | | |
|---|---|---|---|
| | 1 | 2 | 3 |
| Krylene NS | 100 | 100 | 100 |
| 2-naphthalenethiol | | 0.33 | |
| 1-mercapto-2-naphthyl p-toluene-sulfonate | | | 0.33 |
| Mooney Viscosity at 212° F. (ML-4) | 50 | 41 | 39 |

Plasticizer elastomers of this invention may be compounded with conventional vulcanizing assistants and agents in the usual way. Addition of these materials may be started before the plasticizing hot mastication is completed if necessary or desirable. In general, however, it is preferable to complete the plasticizing operation before this is done. No special changes in conventional vulcanizing practice is necessary.

We claim:
1. A compound of the formula

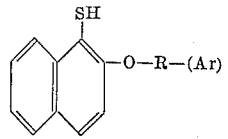

wherein "R" is selected from the group consisting of

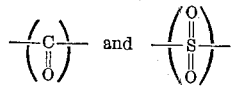

and "(Ar)" is a phenyl, tolyl, xylyl or ethylphenyl radical.

2. A compound according to claim 1 wherein (Ar) is selected from the group consisting of phenyl and tolyl.
3. 1-mercapto-2-naphthyl benzoate.
4. 1-mercapto-2-naphthyl p-toluate.
5. 1-mercapto-2-naphthyl benzensulfonate.
6. 1-mercapto-2-naphthyl p-toluenesulfonate.

No references cited.

CHARLES B. PARKER, *Primary Examiner.*
FLOYD D. HIGEL, *Assistant Examiner.*

UNITED STATES PATENT OFFICE
CERTIFICATE OF CORRECTION

Patent No. 3,325,527                  June 13, 1967

William Baptist Hardy et al.

It is hereby certified that error appears in the above numbered patent requiring correction and that the said Letters Patent should read as corrected below.

Column 1, line 9, beginning with "This" strike out all to and including "compositions." in line 11 same column 1 and insert instead -- This invention relates to improved plasticization of elastomers using a new class of catalytic plasticizers; to elastomeric compositions containing said plasticizers; and to the plasticized compositions. --.

Signed and sealed this 1st day of April 1969.

(SEAL)
Attest:

Edward M. Fletcher, Jr.                  EDWARD J. BRENNER
Attesting Officer                      Commissioner of Patents